(12) United States Patent
Laemmle et al.

(10) Patent No.: US 11,214,156 B2
(45) Date of Patent: Jan. 4, 2022

(54) INDUCTIVE CHARGING DEVICE

(71) Applicant: Mahle International GmbH, Stuttgart (DE)

(72) Inventors: Christopher Laemmle, Stuttgart (DE); Holger Schroth, Maulbronn (DE); Martin Steinbach, Waiblingen (DE); Markus Watzlawski, Esslingen (DE)

(73) Assignee: Mahle International GmbH

( * ) Notice: Subject to any disclaimer, the term of this patent is extended or adjusted under 35 U.S.C. 154(b) by 180 days.

(21) Appl. No.: 16/560,015

(22) Filed: Sep. 4, 2019

(65) Prior Publication Data
US 2020/0139828 A1 May 7, 2020

(30) Foreign Application Priority Data

Nov. 5, 2018  (DE) .......................... 102018218839.4
Aug. 15, 2019 (DE) .......................... 102019212277.9

(51) Int. Cl.
*H02J 50/12* (2016.01)
*B60L 53/12* (2019.01)
*H01F 38/14* (2006.01)

(52) U.S. Cl.
CPC .............. *B60L 53/12* (2019.02); *H01F 38/14* (2013.01); *H02J 50/12* (2016.02)

(58) Field of Classification Search
USPC ........................................................ 320/108
See application file for complete search history.

(56) References Cited

U.S. PATENT DOCUMENTS

| | | | |
|---|---|---|---|
| 9,522,604 B2 | 12/2016 | Altunyurt et al. | |
| 9,715,963 B2 | 7/2017 | Gruenberg et al. | |
| 2011/0181240 A1* | 7/2011 | Baarman | G01R 29/0814 320/108 |
| 2012/0161696 A1* | 6/2012 | Cook | B60L 3/04 320/108 |
| 2014/0111002 A1* | 4/2014 | Horiuchi | H02J 50/005 307/9.1 |
| 2014/0305722 A1* | 10/2014 | Ichikawa | H02J 50/40 180/65.31 |

(Continued)

FOREIGN PATENT DOCUMENTS

| | | |
|---|---|---|
| CN | 103946045 A | 7/2014 |
| CN | 104870243 A | 8/2015 |
| CN | 105073478 A | 11/2015 |

(Continued)

OTHER PUBLICATIONS

German Search Report dated Jul. 24, 2019 related to corresponding German Patent Application No. 10 2018 218 839.4.

(Continued)

*Primary Examiner* — Bryce M Aisaka
(74) *Attorney, Agent, or Firm* — Fishman Stewart PLLC

(57) ABSTRACT

An inductive charging device for an electrically operated vehicle includes a housing, at least one induction coil and at least one magnetic conductor each arranged at least partially in the housing, and a supporting structure arranged at least partly in the housing. The housing includes a bottom and a cover. The support structure includes a first structure portion and a second structure portion. The second structure portion lies at least partly against a cover portion of the cover.

20 Claims, 9 Drawing Sheets

(56) References Cited

U.S. PATENT DOCUMENTS

2019/0074720 A1    3/2019   Krammer
2021/0110960 A1*   4/2021   Weber ....................... H01F 3/10

FOREIGN PATENT DOCUMENTS

| | | |
|---|---|---|
| CN | 107635822 A | 1/2018 |
| DE | 1915077 A1 | 10/1970 |
| DE | 102015111852 A1 | 2/2016 |
| DE | 102015214983 A1 | 2/2017 |
| DE | 102015216157 A1 | 3/2017 |
| DE | 102016205352 A1 | 10/2017 |
| DE | 102017200465 A1 | 11/2017 |
| DE | 102016219476 A1 | 4/2018 |
| DE | 102017202067 A1 | 8/2018 |
| DE | 102017207266 A1 | 10/2018 |
| EP | 2791950 B1 | 1/2019 |
| JP | 2018-018926 A | 2/2018 |
| WO | 2017060387 A1 | 4/2017 |
| WO | 18065435 A1 | 4/2018 |

OTHER PUBLICATIONS

Chinese Search Report dated Mar. 29, 2021 related to corresponding Chinese Patent No. 201910841443.6.
Chinese Office Action dated Apr. 6, 2021 related to corresponding Chinese Patent No. 201910841443.6.

* cited by examiner

INDUCTIVE CHARGING DEVICE

CROSS-REFERENCE TO RELATED APPLICATIONS

This application claims priority to German Application DE 10 2019 212 277.9 filed on Aug. 15, 2019, and German Application DE 10 2018 218 839.4 filed on Nov. 5, 2018, the contents of each of which are hereby incorporated by reference in their entirety.

TECHNICAL FIELD

The present invention relates to an inductive charging device for an electrically operated vehicle.

BACKGROUND

In order to increase the acceptance of electrically driven vehicles among end consumers, it may be advantageous for the energy transfer between a stationary energy source and an energy accumulator of the vehicle to occur in a noncontact manner A noncontact energy transfer is advantageous to the end consumer, since for example no charging cable needs to be carried along or inserted. Furthermore, stationary inductive charging stations may be partly buried in the ground, so that a better integration in a city or country landscape is possible. Moreover, buried inductive charging stations are especially well protected against vandalism damage.

A stationary inductive charging station, connected to a stationary energy source, can generate a magnetic field varying over time by a primary coil. The electrically operated vehicle has an inductive charging device, comprising an induction coil. If the inductive charging device is positioned in the area of the magnetic field of the stationary inductive charging station, the time-varying magnetic field induces an alternating current or an alternating voltage in the induction coil of the inductive charging device. This induced alternating current or alternating voltage may be used to charge the energy accumulator of the vehicle.

As compared to commercial vehicles, the design space available in passenger cars for an inductive charging device is severely limited. Besides the actual energy transfer, however, in many instances the inductive charging device must also have a certain electromagnetic compatibility, include a thermal management to control heat fluxes, have the lowest possible weight, and provide a mechanical protection against outside actions for mechanically sensitive components.

In the tension among these requirements, the problem which the present invention proposes to solve is to indicate an inductive charging device of the aforementioned kind which is designed especially advantageously for use in vehicles.

This problem is solved according to the invention by the subject matter of the independent claim(s). Advantageous embodiments are subject matter of the dependent claims.

SUMMARY

The present invention is based on the general idea of the inductive device having an at least partly integrated supporting structure for the protection of mechanically sensitive components.

The inductive charging device according to the invention can be arranged in an electrically operated vehicle, it being advantageous when the inductive charging device is situated as close as possible to the roadway on which the vehicle is moving. In this way, the number of vehicle components subjected to the time varying magnetic field of an inductive charging station is minimized, so that for example energy losses in the form of eddy currents are avoided. It may be provided that the inductive charging station is designed for a power transfer of at least 10 kW.

The inductive charging device comprises a housing, having a bottom and a cover. The bottom may be facing toward the roadway and the cover may be facing toward the electrically driven vehicle. The bottom may form an underrun protection or ground protection, which protects the components of the inductive charging device against weather factors and/or mechanical forces. The bottom can be made of a fibre/plastic composite, in which reinforcement fibres are embedded in a plastic matrix, preferably using glass fibres as the reinforcing fibres, since these are not electrically conductive and thus are electromagnetically neutral. The production of the bottom can be done for example by extrusion of SMC (Sheet Moulding Compound) and/or glass mat reinforced thermoplastic (GMT). The bottom may have a wall thickness of $(2.0 \pm 1.0)$ mm, preferably 2.0 mm. The bottom may be configured with reinforcement ribs.

The cover also serves for electromagnetic shielding, since magnetic and electrical field emissions are produced during the energy transfer, whose field strength increases with the charging power. In order to avoid a damaging of components of the vehicle, especially electrical components, the cover can be formed from an electrically conductive material, with the thickness of the cover corresponding at least to a skin depth of the magnetic and electrical field emissions at a given frequency of energy transfer for the electrically conductive material of the cover. The cover can be made of aluminium. The cover may have a wall thickness of $(1.5 \pm 0.5)$ mm, preferably 1.5 mm.

The cover and the bottom may be joined to each other for example by a glue connection or by crimping.

The inductive charging device comprises at least one induction coil and at least one magnetic conductor, which are arranged at least partly in the housing. The induction coil may be connected in an electrically conductive manner to an electronic module. The electronic module may comprise at least one power electronic device which is designed for the transforming of electrical voltages and electrical currents. The induction coil may be designed as a flat spiral coil or a double D coil. The induction coil may be formed from stranded coil wires with a diameter of $(5.0 \pm 2.0)$ mm, preferably 5.0 mm. The induction coil may be formed at least in part from copper. Moreover, it may be provided that the induction coil is formed at least in part from aluminium.

The magnetic conductor guides the magnetic field in a suitable manner and thus increases the efficiency of the energy transfer and additionally shields the vehicle, disregarding stray fields, against substantially time varying magnetic fields of the inductive charging station. The magnetic conductor has a higher magnetic permeability than air and can be formed at least in part from ferrimagnetic and/or ferromagnetic materials. The magnetic conductor may be formed as a plate element. Moreover, the magnetic conductor may be connected to the cover across a thermally conductive element or be attached with a thermally conductive glue or be fastened to the cover by means of hot pressing. The thermally conductive element may have wall thickness of $(1.0 \pm 0.5)$ mm, preferably 1.0 mm. It may be provided that the magnetic conductor has a wall thickness of (5.0±2.0) mm, preferably 5.0 mm.

The inductive charging device comprises a supporting structure, which is arranged at least partly in the housing, wherein the supporting structure comprises a first structure portion and a second structure portion, wherein the second structure portion lies at least partly against a cover portion of the cover. The term cover portion can be taken to mean the entire surface or a partial surface of the cover, facing toward the bottom. The supporting structure may preferably have a single piece and/or a single part construction. It may also be provided that the first structure portion can be mechanically joined to the second structure portion, wherein both a releasable and a nonreleasable connection are conceivable. The supporting structure may be formed separately from the housing, especially from the bottom and/or from the cover.

The supporting structure can be made from a material having a higher modulus of elasticity than the material used to make the magnetic conductor. The supporting structure may comprise structures having cross section dimensions with a cross section width of (14.0±6.0) mm, preferably 14.0 mm, and a cross section height of (6.0±2.0) mm, preferably 6.0 mm. The supporting structure may be designed as a solid profile, hollow profile, or also one portion as a solid profile and one portion as a hollow profile. The first structure portion may comprise structures having cross section dimensions with a cross section width of (14.0±2.5) mm, preferably 14.0 mm, and a cross section height of (18.0±4.0) mm, preferably 18.00 mm. It may be provided that the supporting structure is entirely situated inside the housing of the inductive charging device.

The supporting structure affords an adequate mechanical protection for protecting mechanically sensitive components, such as the magnetic conductor or also electronic modules, against mechanical forces due to rough ground on the roadway or also the impact of larger stones, for example. Thanks to the integration of the supporting structure in the housing of the inductive charging device, the required design space is minimized. The supporting structure by the first structure portion absorbs forces which may result in a deformation of the bottom, and it channels them by the second structure portion in part to the cover portion and/or vehicle portion, so that these forces cannot act on the mechanically sensitive components.

It may be provided that the inductive charging device has a width and length of (350.0±10.0) mm, preferably 350.0 mm, while a height of (27.0±10.0) mm, preferably 27.0 mm, is provided.

In a further advantageous embodiment of the solution according to the invention, it is provided that the first structure portion lies at least partly against a bottom portion of the bottom. The term bottom portion can be taken to mean the entire surface or a partial surface of the bottom, facing toward the cover. This counteracts an excessive deformation of the bottom under mechanical actions, since the acting forces are absorbed by the first structure portion or by the supporting structure.

It may be provided that the first structure portion lies against a bottom portion forming a central portion of the bottom. The second structure portion may lie against a cover portion forming a rim portion of the cover.

In a further advantageous embodiment of the solution according to the invention, it is provided that between the supporting structure and the bottom there is arranged at least one coil bottom, wherein the first structure portion lies at least partly against the coil bottom. The coil bottom may be made for example by thermoforming of a fibre composite material. The coil bottom may have a wall thickness of (1.0±0.3) mm, preferably 1.0 mm Organic sheets with glass fibres may be provided as the fibre composite material, for example.

It may be provided that the bottom has a rim portion. The coil bottom may be configured preferably as a tub with a planar bottom, the tub having a rim structure which is formed complementary to the rim portion of the bottom. The tub can be formed preferably from continuous fibre reinforced plastic. The coil bottom may be joined structurally and/or by integral bonding (e.g., by gluing) to the bottom in the resulting contact zones.

It may be provided that these structural connections between bottom and coil bottom are partly present. In particular, these structural connections may be provided in the area of the first structure portion and/or in the area of the lateral rim structure of the coil bottom. Thanks to such partial structural connections between bottom and coil bottom, in combination with an at least partially present bulge of the bottom and in combination with the supporting structure, it is possible to form a structural unit which transfers forces from the direction of a roadway (e.g. in the event of a load caused by stone impact or impact against a bollard) substantially via the supporting structure to the vehicle and/or to partial areas of the vehicle. In this case, the bulge of the bottom can extend toward the roadway and away from the coil bottom.

In one advantageous modification of the solution according to the invention, it is provided that the inductive charging device in an installed position can be secured on the electrically operated vehicle by at least one vehicle portion, wherein the second structure portion in the installed position of the inductive charging device lies at least partly against the vehicle portion of the electrically operated vehicle.

In the installed position of the inductive charging device the cover may lie against the vehicle. The vehicle portion may comprise structural elements of the vehicle as well as corresponding fastening means, enabling a fastening of the cover and/or the bottom to the structural element of the vehicle. A fastening means can be, for example, a screw element, which is inserted partly through the structural element of the vehicle and partly through a receiver of the cover and/or the bottom.

Since the second structure portion lies at least partly against the vehicle portion and/or is rigidly joined to the vehicle portion in terms of structure, the forces occurring are not entirely transmitted to the cover, but instead are partly transmitted to the vehicle portion and thus partly to the vehicle. In this way, mechanically structurally strong portions of the vehicle can be utilized, so that the cover can be designed with a lesser wall thickness, without the mechanical resistance of the inductive charging device being impaired.

The supporting structure may be designed such that at least half of the occurring forces are transmitted to the vehicle portion. It may be provided that the bottom comprises a reinforced rim portion, against which partial regions of the second structure portion lie which do not lie against the vehicle portion. In this way, the amount of forces acting on the cover can be reduced. The reinforced rim portion may comprise structural reinforcements.

In a further advantageous embodiment of the solution according to the invention, it is provided that the inductive charging device in an installed position can be secured on the electrically operated vehicle by at least one vehicle portion, wherein the second structure portion in the installed position of the inductive charging device lies at least partly against the bottom, wherein at least a partial portion of the bottom, which is situated at least partly between the second structure portion and the vehicle portion, comprises structural reinforcements, especially geometrical structural reinforcements.

In such embodiments where the second structure portion ends in proximity to the vehicle portion, the bottom is formed structurally reinforced between the end of the structure portion and the vehicle portion, in order to transmit the forces from the second structure portion to the vehicle portion. Structural reinforcements can be taken to mean mechanically resistant configurations of the bottom. Structural reinforcements may also be formed by additional reinforcing elements.

In a further advantageous embodiment of the solution according to the invention, it is provided that the first structure portion is configured as a circular ring and/or a cylinder and/or a hollow cylinder, wherein the second structure portion comprises multiple supporting arms, wherein the supporting arms lie against the first structure portion and are arranged spaced apart from each other in the circumferential direction of the first structure portion. It may be provided that the supporting arms are present inside and/or outside the first structure portion. It may furthermore be provided that the supporting arms are arranged substantially equidistant in the circumferential direction of the first structure portion. Moreover, it may be provided that an even number of supporting arms is provided. It may be provided that the second structure portion has eight supporting arms, between each of which an angle spacing of 45° is present in the circumferential direction of the first structure portion.

The first structure portion in the form of a circular ring enables a substantially uniform distribution of the occurring forces among all supporting arms. In this way, a compact and mechanically stable construction can be achieved with a low weight of the supporting structure. It may be provided that supporting arms are provided inside the first circular ring structure portion, having a shorter lengthwise extension than the supporting arms outside the first structure portion. It may be provided that eight supporting arms are provided inside the first structure portion, being joined together at the centre of the first circular ring structure portion.

It may be provided that a plurality of magnetic conductors are provided inside the inductive charging device, being arranged for example between the supporting arms. It is also conceivable for the number of supporting arms to correspond to the number of the magnetic conductors. The magnetic conductors may have a triangular geometrical configuration.

The supporting structure may be formed separate from the housing, especially from the bottom and/or from the cover. The supporting arms may be arranged at least for a section free of contact with the housing, especially the bottom and/or the cover. With respect to the circumferential direction, at least one magnetic conductor may be arranged between two adjacent supporting arms, especially one magnetic conductor and/or two magnetic conductors. A respective magnetic conductor, especially a single-piece magnetic conductor, may be arranged between two supporting arms. A respective magnetic conductor piece can lie between two supporting arms.

In one advantageous modification of the solution according to the invention, it is provided that at least one supporting arm has a partial portion of nonlinear, preferably curved profile. Preferably, this nonlinear profile may be realized such that this partial portion of the supporting arm is more distant from the bottom than would be the case for a linear connection of starting and end points of the supporting arm. This optimizes the force transfer and at the same time creates design space for the induction coil. One radius of curvature of the curvature of this partial portion may be larger than a second radius of curvature at the transition between the supporting arm and the first structure portion. In general, the two radii of curvature need not be constant, but rather may change during the course of the curvature. In this way, the transfer of the acting forces from the first structure portion to the second structure portion and thus to the vehicle portion is improved. Moreover, this enables an elastic or resilient relative movement between the first structure portion and the second structure portion, so that some of the acting forces are converted into an elastic deformation of the supporting structure. In this way, the mechanical loading of the vehicle portion and/or the cover can be reduced.

In a further advantageous embodiment of the solution according to the invention, it is provided that the induction coil is arranged at least partly, especially with respect to a Z-direction, between the second structure portion of the supporting structure and the bottom of the housing. In this way, an especially compact and mechanically robust construction of the inductive charging device is made possible.

In one advantageous modification of the solution according to the invention, it is provided that at least a partial portion of the bottom forms a bulge extending away from the cover, especially a curved-line and/or a curved-surface bulge. It may be provided that the partial portions of the bottom against which the first structure portion does not lie respectively has a bulge extending away from the cover. In this way, first of all the forces acting on the inductive charging device can be led away across the bottom to the vehicle portion, and under an excessive deformation of the bulges the supporting structure will absorb some of the acting forces and thus counteract a destruction of the bottom.

In a further advantageous embodiment of the solution according to the invention, it is provided that the cover has at least some reinforcing beads. It may be provided that the reinforcing beads are formed in the partial portion of the cover against which the second structure portion of the supporting structure lies. The reinforcing beads may have an arrangement which is complementary to the arrangement of the supporting arms. If, for example, the supporting arms are arranged in radiating fashion, the reinforcing beads may also be arranged in radiating fashion. In this way, the stiffness or mechanical resistance of the cover is enhanced, so that the cover can either have a thinner wall thickness or it can absorb larger forces for a given wall thickness. In addition, the reinforcing beads have a damping effect on possible vibrational states of the cover or the inductive charging device.

In one advantageous modification of the solution according to the invention, it is provided that at least one cooling duct system is provided between the cover and the bottom for the flow control of a fluid. The cooling duct system may comprise a fluid inlet and a fluid outlet. The cooling duct system may form multiple cooling ducts by arranging an intermediate bottom at least on one partial surface of the cover in an integrally bonded manner, so that a cooling duct is formed in part by the cover and in part by the intermediate bottom. The intermediate bottom may be formed for example by injection moulding of plastic. The intermediate bottom may have a maximum wall thickness of $(4.0\pm1.0)$ mm, preferably 4.0 mm. The intermediate bottom of plastic can be mounted on the cover by gluing, by injecting or by clinching. The intermediate bottom can be made of aluminium, especially as an embossed sheet metal part. The intermediate bottom may have a wall thickness of (1.0±0.5) mm, preferably 1.0 mm. In this case, the intermediate bottom can be mounted by soldering or gluing on the cover. It may be provided that the cooling duct system comprises multiple partial cooling areas, wherein the partial cooling areas are fluidically connected to each other. Moreover, it is conceivable that a flow of fluid through the partial cooling areas can occur independently of each other. The partial cooling areas may have a substantially triangular contour.

It may be provided that the magnetic conductor is connected in a thermally conductive manner to the cooling duct system by a thermally conductive element, the thermally conductive element having a lower thermal resistance as compared to air. The thermally conductive element may be, for example, a glue with a high thermal conductivity. The thermally conductive element may be a heat conducting film or paste. The thermally conductive element may have a wall thickness of (1.0±0.5) mm, preferably 1.0 mm.

In a further advantageous embodiment of the solution according to the invention, it is provided that at least one coil bottom and one coil holder, especially a coil holder formed separately from the coil bottom, are provided between the induction coil and the bottom. The coil holder can be made of a plastic. The coil holder may have a wall thickness of (0.6±0.2) mm, preferably 0.6 mm. The coil bottom can be made for example by thermoforming from a fibre composite material. The coil bottom may have a wall thickness of (1.0±0.3) mm, preferably 1.0 mm. The fibre composite material may be, for example, organic sheets with glass fibres. The coil holder may be glued onto the coil bottom or be embossed from the plastic matrix during the thermoforming of the coil bottom. The induction coil may be clipped and/or glued into the coil holder. The coil bottom also serves for stabilizing the bottom with respect to deformations, since the coil bottom has high tensile strength on account of the fibre mat material.

In one advantageous modification of the solution according to the invention, it is provided that the first structure portion lies at least partly against the coil bottom.

In a further advantageous embodiment of the solution according to the invention, it is provided that the first structure portion is connected in a shear-resistant manner to the coil bottom, and the second structure portion is connected in a shear-resistant manner to the cover. This makes possible an especially mechanically stable configuration of the inductive charging device.

In one advantageous modification of the solution according to the invention, it is provided that a thermally conductive element is provided between the magnetic conductor and the cooling duct system, in order to make possible an improved thermal contacting. In one advantageous modification of the solution according to the invention, it is provided that a thermally conductive element is provided between the induction coil and the magnetic conductor, in order to divert the thermal energy arising in the induction coil across the thermally conductive element and the magnetic conductor to the cooling duct system.

In a further advantageous embodiment of the solution according to the invention, it is provided that the cover has a receiving portion, wherein an electronic module is accommodated in the receiving portion. The electronic module may comprise for example a power electronic unit and/or a control unit and/or a communication unit and/or a monitoring unit and/or an electrical heating element. The receiving portion of the cover may be formed as a recess and/or as an indentation of the cover, the receiving portion being formed for example of aluminium by deep drawing or embossing. The receiving portion may have a wall thickness of (1.0±0.5) mm, preferably 1.0 mm. The receiving portion may be connected to the cover by gluing, by soldering, or by a fastening means to the cover.

In one advantageous modification of the solution according to the invention, it is provided that the cover in an installed position of the inductive charging device forms, with a vehicle-side shielding element, especially with a vehicle-side shielding element formed separately with respect to the cover, a shielding against electrical and magnetic fields. In this way, both a negative affecting of the functioning of components of the vehicle, especially electronic components, is prevented, and an excessive heating by eddy currents of mostly vehicle structural components made from electrically conductive materials is prevented.

It may be provided that thermally sensitive electronic components are attached on the side of the cover facing away from the stranded wires, in order to transfer power losses via the cover to the cooling duct system.

It may be provided that the bottom and/or the cover and/or the supporting structure is adapted to the vehicle portion of the respective vehicle, the rest of the components of the inductive charging device being standardized for use with any given vehicle.

Furthermore, it may be provided that the cover has embossings and/or recesses which provide additional design space in narrow regions. This design space may be used for example by individual large-sized electronic components (such as filter coils) in order to further reduce the overall dimension of the application.

It may also be provided that non-electrically conductive glass fibres are used for all fibre-containing materials, due to electromagnetic neutrality. The use of other non-electrically conductive fibre materials is likewise conceivable.

In one advantageous modification of the solution according to the invention, it is provided that an electronic module is arranged on the side of the cover facing toward the vehicle. The electronic module may comprise at least a power electronic device designed for the transformation of electric voltages or electric currents.

In one advantageous modification of the solution according to the invention, it is provided that an electronic module is arranged both in a receiving portion in the cover and on the side of the cover facing toward the vehicle. The electronic module may comprise at least a power electronic device designed for the transformation of electric voltages or electric currents.

In one advantageous modification of the solution according to the invention, it is provided that the inductive charging device comprises an EMC protection device, wherein the EMC protection device completely covers an electronic module and is secured all around by suitable connecting means on the side of the cover facing toward the vehicle such that the electromagnetic signals given off by the electronic module cannot interfere with other electrical device units located in the vicinity. The electronic module may comprise at least a power electronic device designed for the transformation of electric voltages or electric currents.

In one especially suitable embodiment, the encircling connection between the EMC protection device and the cover likewise fulfils sufficient tightness requirements (e.g., IP69) with respect to toxic media.

The EMC protection device may consist of electromagnetic barrier materials and/or comprise them, or it may also consist of hybrid materials of non-electromagnetic barrier materials and/or comprise them. The EMC protection device may be provided with a suitable barrier coating and/or a suitable barrier structure. The barrier structure may be formed for example as a mesh structure made of an electrically conductive material.

The EMC protection device may consist of electromagnetic barrier materials (such as aluminium) with a wall thickness of (1.0±0.5) mm, preferably 1.0 mm and/or comprise them, or it may also consist of hybrid materials of non-electromagnetic barrier materials (such as plastic) with a wall thickness of (1.5±1.0) mm, preferably 1.5 mm, and/or comprise them, which is provided with a suitable barrier coating (such as a metal coating) of wall thickness (0.1±0.09) mm, preferably 0.1 mm, and/or a suitable barrier structure (such as a metal lattice structure) of mesh size (1.5±1.0) mm, preferably 1.5 mm and wire thickness (0.3±0.2) mm, preferably 0.3 mm.

In one advantageous modification of the solution according to the invention, it is provided that the EMC protection device comprises lead-throughs and/or suitable adapters for electrical connections as well as fluidic connections of the inductive charging device.

In a further advantageous embodiment of the solution according to the invention, it is provided that the second structure portion forms an encircling structural frame in the circumferential direction, which lies at least partly against a cover portion of the cover. The encircling structural frame may be formed entirely and/or continuously encircling with respect to the circumferential direction. At least one side surface of the encircling structural frame facing away from the bottom may lie entirely against the cover portion of the cover, especially by contacting it. The encircling structural frame may be formed partly or entirely of a continuous fibre reinforced plastic. The encircling structural frame may have a rectangular and/or square shape. In this case, the encircling structural frame may comprise a plurality of substantially linear extending structural frame sections. The linear extending structural frame sections may be joined to each other by a corner region. The corner region may be rounded and/or curved for at least a section. Each time, two linear extending structural frame sections situated adjacent to each other in regard to the circumferential direction may be oriented substantially transversely and/or perpendicular to each other. It may be provided that the encircling structural frame comprises at least four linear extending structural frame sections, which are joined to each other by at least four corner regions, one corner region being formed between two adjacent structural frame sections in regard to the circumferential direction. The encircling structural frame enables a more uniform distributing of vertical forces acting along the Z-direction in the second structure portion.

In one advantageous modification of the solution according to the invention, it is provided that at least one receiving device is formed in at least one corner region of the structural frame, and/or the first structure portion is formed substantially as a square with rounded corner regions. It may be provided that each corner region of the structural frame, especially at least four corner regions of the structural frame, forms a respective receiving device. At least one receiving device may be designed to receive at least one partial region of the vehicle portion, especially to receive a fastening means. In this case, at least one receiving device may be formed at least partly complementary to the fastening means. At least one receiving device may be formed as a ring and/or as a sleeve. In this case, it may be provided that the fastening means passes at least partly through the ring and/or sleeve-shaped receiving device. Thanks to the substantially square configuration of the first structure portion with rounded corner regions, a more uniform distributing of loads in the first structure portion can be achieved.

In a further advantageous embodiment of the solution according to the invention, it is provided that the second structure portion comprises multiple supporting arms, wherein the supporting arms lie respectively by a first end against the first structure portion and are mutually spaced apart in the circumferential direction of the first structure portion, wherein the supporting arms lie respectively by a second end against the encircling structural frame. The second ends of the supporting arms may for example lie against the linear extending structural frame sections of the structural frame. The supporting arms may be connected by integral bonding and/or force locking and/or form fit to the first structure portion and/or to the encircling structural frame, especially to the linear extending structural frame sections.

It may be provided that the supporting arms are formed inside and/or outside the first structure portion. It may furthermore be provided that the supporting arms are arranged substantially equidistant in the circumferential direction of the first structure portion. Moreover, it may be provided that an even number of supporting arms is provided. It may be provided that the second structure portion has eight supporting arms, between each of which an angle spacing of 45° is present in the circumferential direction of the first structure portion.

The supporting arms for at least a section in the circumferential direction are oriented spaced apart and/or rotated in angle, especially substantially spaced apart and/or rotated in angle by 22.5°, with respect to at least one axis of symmetry and/or plane of symmetry of the structural frame. In a top view plane looking down on the structural frame, axes of symmetry may be considered as being intersecting lines between the top view plane and the corresponding plane of symmetry, while the respective plane of symmetry is oriented perpendicular and/or transversely to the top view plane. It may be provided that the planes of symmetry are oriented perpendicular and/or transversely to the circumferential direction. At least one axis of symmetry and/or plane of symmetry of the structural frame may be formed as a diagonal axis and/or diagonal plane. A diagonal axis and/or diagonal plane runs through at least two mutually spaced corner regions of the structural frame as well as through and/or along a centre of gravity of the structural frame. At least one axis of symmetry and/or plane of symmetry of the structural frame may be formed as a midpoint axis and/or midpoint plane. A midpoint axis and/or midpoint plane runs through at least two midpoints of two spaced-apart linear extending structural frame sections of the structural frame and through and/or along a centre of gravity of the structural frame. The structural frame may have at least a first diagonal axis and/or first diagonal plane, which is oriented perpendicular and/or transversely to a second diagonal axis and/or second diagonal plane. The structural frame may comprise at least a first midpoint axis and/or first midpoint plane, which is oriented perpendicular and/or transversely to a second midpoint axis and/or second midpoint plane. The midpoint axes and/or midpoint planes may be oriented with respect to the diagonal axes and/or diagonal planes substantially spaced apart and/or rotated in angle by 45° in regard to the circumferential direction.

Thanks to the encircling structural frame, the acting forces and especially the forces acting along the Z-direction can be distributed more uniformly among the supporting arms. Thanks to a mounting of the supporting arms on the linear extending structural frame sections of the structural frame, the magnetic conductors can be introduced such that a concentration of the magnetic field and/or the magnetic flux density in the corners of the induction coil is supported and/or favoured by the distribution of the supporting arms. Thus, on the whole, the structural and/or mechanical resistance is increased and in addition the distribution of the magnetic field and/or the magnetic flux density is improved and/or becomes more homogeneous.

In a further advantageous embodiment of the solution according to the invention, it is provided that at least one magnetic conductor is formed from multiple partial pieces, especially two and/or more geometrically diverse partial pieces, wherein the partial pieces of the at least one magnetic conductor are joined together by integral bonding by an intermediate material. The intermediate material can be, for example, an adhesive and/or a glue. The partial pieces may have the shape of a triangle or trapezium. This triangular or trapezoidal configuration is seen, for example, in a top view looking down on the inductive charging device. It may be provided that the inductive charging device comprises a first group of eight identical partial pieces and a second group of four identical partial pieces, in order to form the magnetic conductor. In this case, it may be provided that four partial pieces of the first group are joined together with four partial pieces of the second group by integral bonding by an intermediate material. Thus, it may be provided that the inductive charging device forms at least four single-piece magnetic conductors and four two-piece magnetic conductors. The partial pieces of the first group may have a larger physical volume than the partial pieces of the second group. Partial pieces of the first group situated opposite a corner region of the structural frame with regard to at least one diagonal axis and/or one diagonal plane may be integrally bonded to at least one partial piece of the second group by an intermediate material. In such a case, the partial piece of the second group may be situated between a corner region of the structural frame and the partial piece of the first group with respect to at least one diagonal axis and/or one diagonal plane. The partial piece of the first group can be integrally bonded with the partial piece of the second group along a joining region in which the intermediate material is introduced. The joining region can be oriented substantially perpendicular and/or transversely to at least one of the diagonal axes and/or one of the diagonal planes. The magnetic conductor may be introduced, in terms of design space, such that a concentration of the magnetic field and/or the magnetic flux density in the corners of the induction coil is supported and/or favoured.

In a further advantageous embodiment of the solution according to the invention, it is provided that at least one structural frame section of the structural frame forms at least one receiving device, and/or at least one structural frame section of the structural frame forms at least two receiving devices spaced apart along the structural frame section. The structural frame section may be a substantially linear extending structural frame section. It may be provided that each structural frame section of the structural frame forms at least one receiving device or multiple receiving devices. In particular, it may be provided that each structural frame section of the structural frame forms at least two receiving devices spaced apart along the respective structural frame section. In an encircling structural frame with the shape of a rectangle and/or square, eight receiving devices may be formed, for example, while each time two of these receiving devices can be formed by a substantially linear extending structural frame section. In this way, the mechanical resistance of the attachment of the inductive charging device to an electrically operated vehicle can be improved.

In a further advantageous embodiment of the solution according to the invention, it is provided that at least one supporting arm is arranged on at least one receiving device, and/or multiple supporting arms are arranged respectively on at least one receiving device, and/or all supporting arms are arranged respectively on at least one receiving device. It may be provided that different supporting arms are arranged on different receiving devices. Arranged can be taken to mean that the respective supporting arm is arranged contacting and lying against the receiving device and/or the respective supporting arm is connected by integral bonding and/or form fit and/or force locking to the receiving device. In this way, a more uniform distributing of the load among the supporting arms can be achieved.

Further important features and benefits of the invention will emerge from the dependent claims, from the drawings, and from the corresponding description of the figures with the aid of the drawings.

Of course, the features mentioned above and those yet to be explained in the following may be used not only in the particular indicated combination, but also in other combinations or standing alone, without leaving the scope of the present invention.

Preferred exemplary embodiments of the invention are represented in the drawings and shall be explained more closely in the following description, where the same reference numbers pertain to the same or similar or functionally equivalent components.

BRIEF DESCRIPTION OF THE DRAWINGS

There are shown, each time schematically.

DETAILED DESCRIPTION

Figure 1:
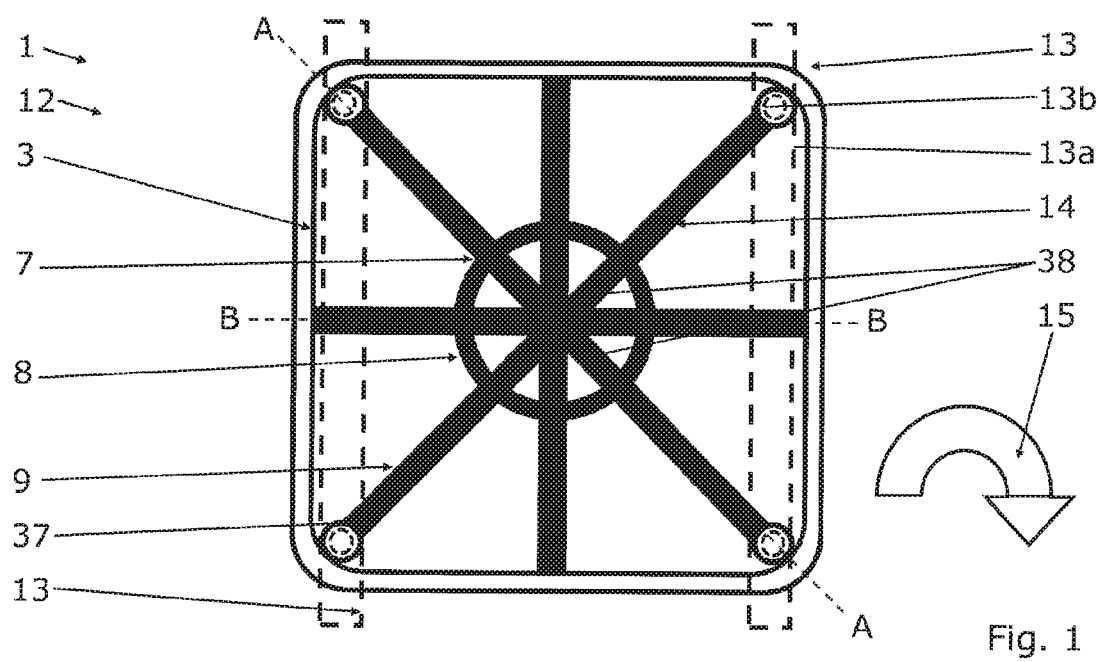
FIG. 1 shows a greatly simplified top view of an inductive charging device according to the invention in its installed position.

FIG. 1 shows a greatly simplified top view of an inductive charging device 1 according to the invention in its installed position 12, showing here the bottom 3 and the supporting structure 7. The supporting structure 7 comprises a first structure portion 8, having a circular ring contour in the top view. Moreover, the supporting structure 7 comprises a second structure portion 9, which in this exemplary embodiment is formed by eight supporting arms 14, arranged at a spacing from one another about the first structure portion 8 in the circumferential direction 15.

Vehicle portions 13 are provided, which can be utilized in order to secure the inductive charging device 1 to structural elements 13a of a vehicle, not shown. This can be done by suitable fastening means 13b, such as screw connections. The structural elements 13a and the fastening means 13b are shown by broken lines in FIG. 1. As shown in FIG. 1, four of the supporting arms 14 are connected to the vehicle portions 13, while four other supporting arms 14 are connected to a rim portion of the bottom 3 or lie against it. At least the supporting arms 14 lying against the vehicle portion 13 may comprise receiving devices 37, which may be designed to receive at least one partial region of the vehicle portion 13, especially the fastening means 13b. In this case the receiving devices 37 may be configured at least partly complementary to the fastening means 13b. These receiving devices 37 may have a ring shape.

Inside the first circular ring structure portion 8 there are provided supporting arms 38, for example, having a shorter lengthwise extension than the supporting arms 14 outside the first structure portion 8.

Figure 2:
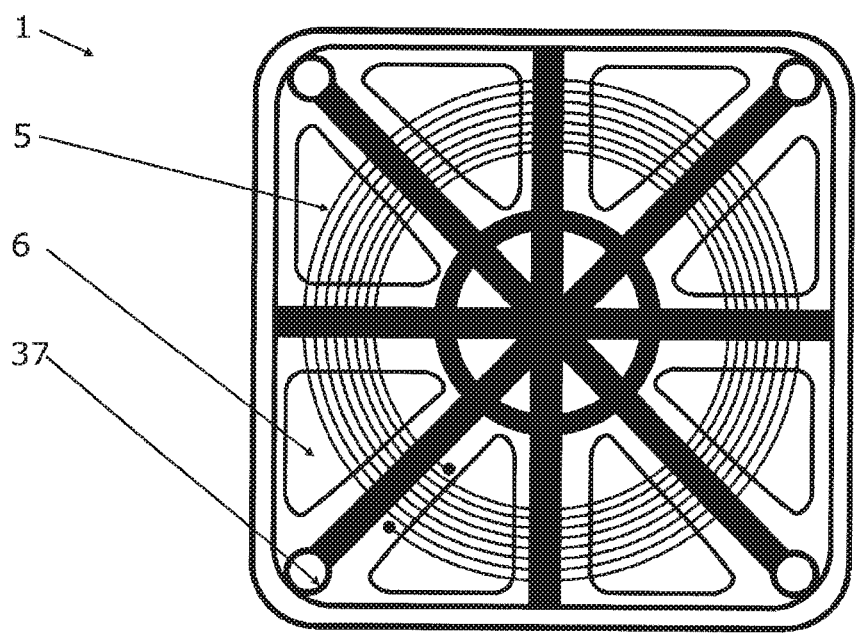
FIG. 2 shows a further top view of an inductive charging device according to the invention.

FIG. 2 shows in addition, as compared to FIG. 1, an induction coil 5 as well as eight magnetic conductors 6, each having a triangular geometrical configuration. The induction coil 5 in this exemplary embodiment is formed as a flat spiral coil, while a double D configuration of the induction coil 5 is also possible.

Figure 3:
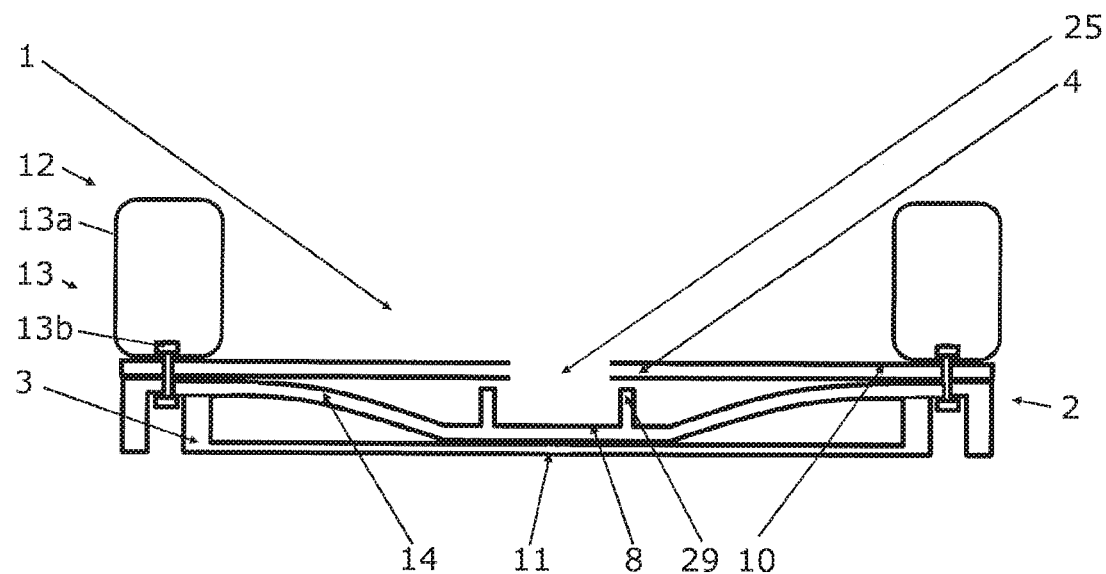
FIG. 3 shows a greatly simplified diagonal section along line A-A in FIG. 1 through an inductive charging device according to the invention in its installed position.

FIG. 3 shows a greatly simplified side view of an inductive charging device 1 according to the invention in its installed position 12, also representing structural elements 13a of a vehicle and suitable fastening means 13b in the vehicle portion 13. The inductive charging device 1 comprises a cover 4, which lies partly against the bottom 3, while the supporting structure 7 is arranged between the bottom 3 and the cover 4.

The first structure portion 8 of the supporting structure 7 lies against a bottom portion 11 of the bottom 3. As illustrated for example in FIG. 5, it may also be provided that a coil bottom 22 is arranged between the first structure portion 8 of the supporting structure 7 and the bottom portion 11 of the bottom 3. The second structure portion 9 and the supporting arms 14 of the supporting structure 7 lie at least partly against a cover portion 10 of the cover 4.

The first structure portion 8 is configured at least partly as a hollow cylinder, with a partial region 29 of the first structure portion 8 extending in the direction of the cover 4, while it may be provided that the partial region 29 does not lie against the cover 4 in the unloaded state. It is also conceivable for the partial region 29 to lie against the cover 4 in the unloaded state. The cover 4 comprises a receiving portion 25, which in this exemplary embodiment is configured as a recess. As is schematically indicated in FIG. 4 to FIG. 7, the receiving portion 25 can receive an electronic module 26. It may be provided that the receiving portion 25 is arranged substantially flush with the partial region 29 of the first structure portion 8.

Figure 4:
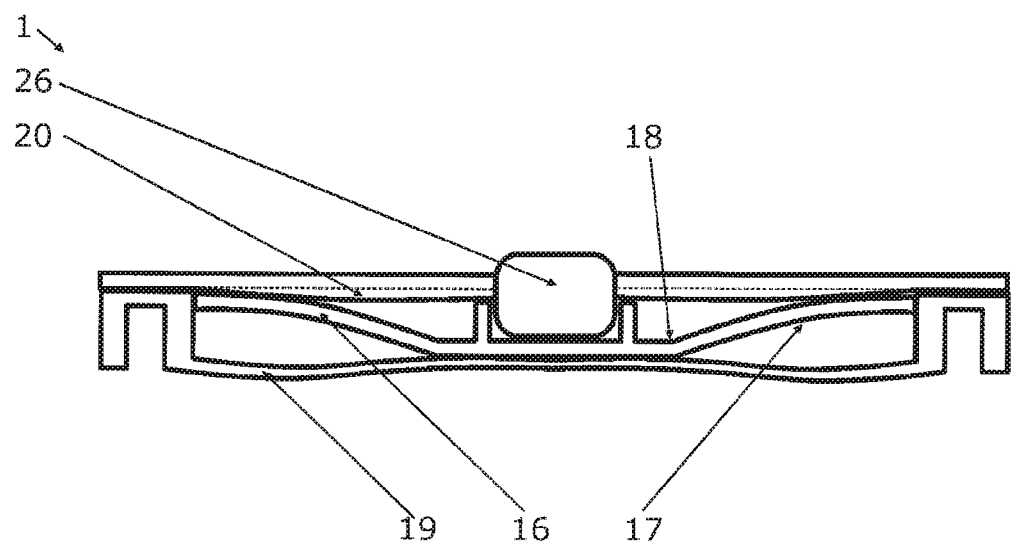
FIG. 4 shows a greatly simplified cross section along line B-B in FIG. 1 through an inductive charging device according to the invention with an electronic module.

FIG. 4 shows a greatly simplified side view of an inductive charging device 1 according to the invention with an electronic module 26. As compared to FIG. 3, the cover 4 has reinforcement beads 20, in order to enhance both the mechanical stability of the inductive charging device 1 as a whole and also the mechanical stability of the cover 4. In addition, the bottom 3 has bulges 19 extending away from the cover 4 in partial regions where the first structure portion 8 does not lie against them.

The second structure portion 9 and the supporting arms 14 have a nonlinear profile with a curvature 16 relative to the bottom 3. The supporting arms 14 thus have a bend toward the cover 4, at least for a section. The curvature 16 has a radius of curvature 17 which is greater than the radius of curvature 18 at the transition between the first structure portion 8 and the second structure portion 9.

Figure 5:
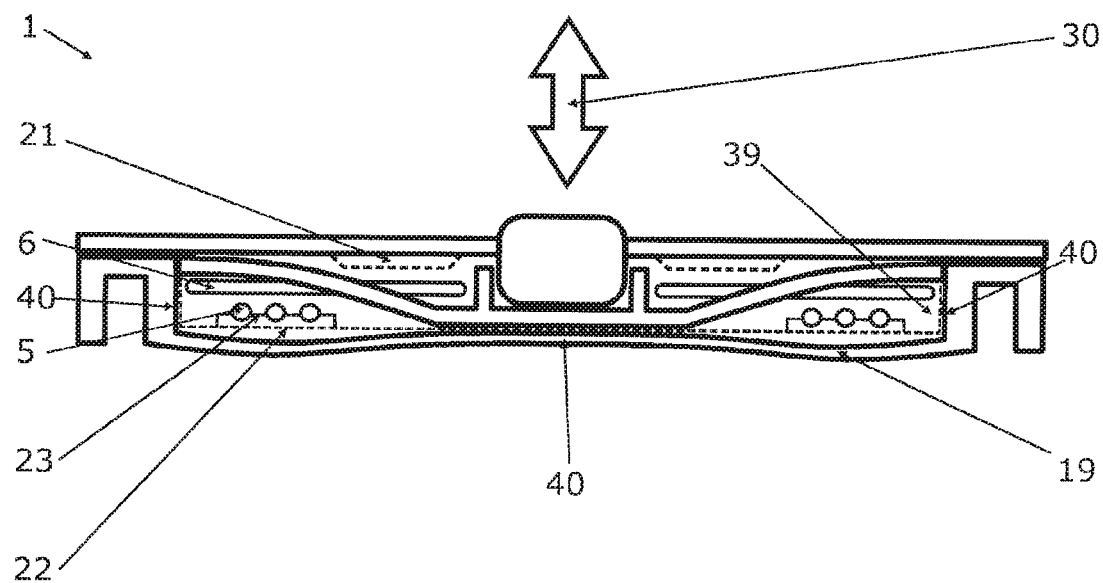
FIG. 5 shows a cross section along line B-B in FIG. 1 through an embodiment of the inductive charging device according to the invention with a cooling duct system.

FIG. 5 shows a side view of one embodiment of the inductive charging device 1 according to the invention with a cooling duct system 21. Moreover, the magnetic conductor 6 and the induction coil 5 are also shown. The induction coil 5 comprises multiple stranded wire windings, which are arranged in a coil holder 23. The coil holder 23 is arranged on a coil bottom 22, which may have an extension corresponding partly or also entirely to the surface of the bottom 3 and/or a bottom portion.

The coil bottom 22 is configured preferably as a tub with a planar bottom and a rim 39 formed complementary to the bottom 3, formed preferably from continuous fibre reinforced plastic. The coil bottom 22 may be joined structurally (e.g., by gluing) to the bottom 3 in the resulting contact zones 40. This structural connection is provided especially in the area of the first structure portion 8 and in the area of the lateral rim structure of the coil bottom 22. Thanks to these partial structural connections between the bottom 3 and the coil bottom 22, in combination with the bulge 19 in the bottom 3, an especially advantageous structure is produced, which can divert forces from the direction of the roadway (e.g. in the event of a load caused by stone impact or impact against a bollard), acting substantially parallel to the Z-direction 30, via the first supporting structure 8 and the second supporting structure 9 to the vehicle portion 13 or the bodywork structure of the vehicle.

Figure 6:
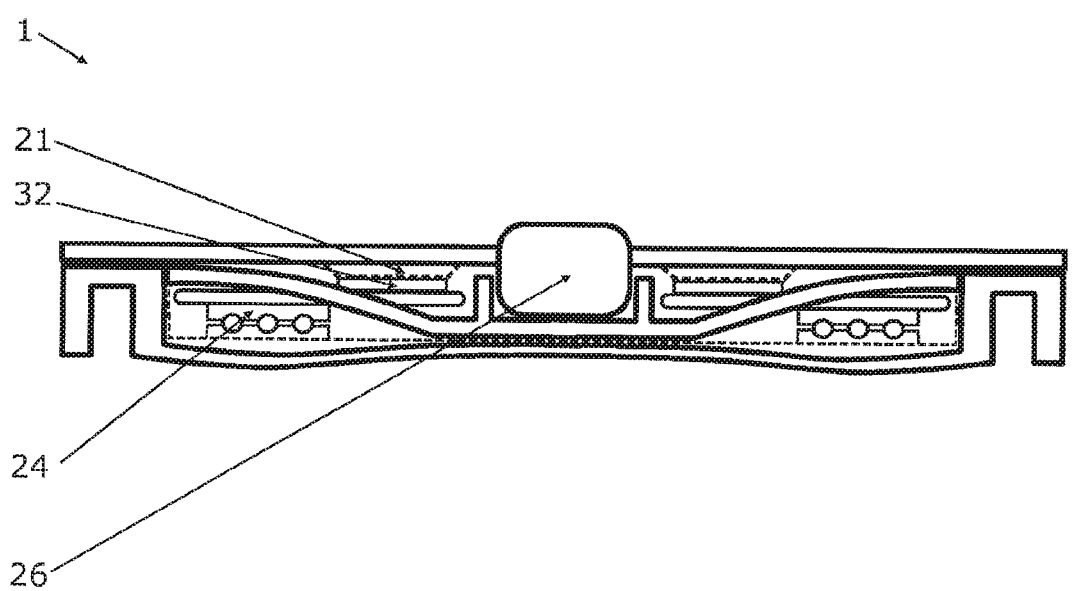
FIG. 6 shows a cross section along line B-B in FIG. 1 through another embodiment of the inductive charging device according to the invention with special interface materials for the thermal connection.

In FIG. 6 as compared to FIG. 5 a thermally conductive element 24 is provided between the induction coil 5 and the magnetic conductor 6. Between the cooling duct system 21 and the magnetic conductor 6 in this embodiment there is provided a further thermally conductive element 32.

Figure 7:
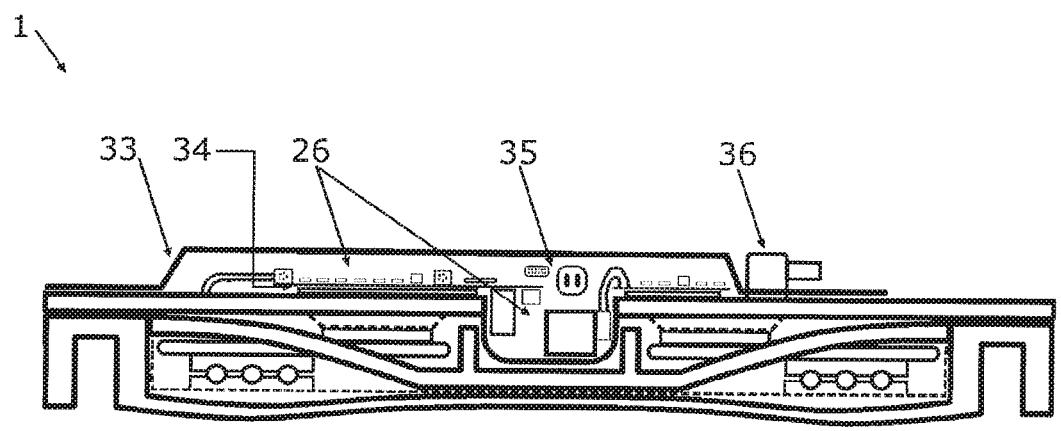
FIG. 7 shows a cross section along line B-B in FIG. 1 through another embodiment of the inductive charging device according to the invention with an electronic module, which may comprise a power electronic unit, and with an EMC protection device.

FIG. 7 shows a cross section along line B-B in FIG. 1 through another embodiment of the inductive charging device 1 according to the invention with an electronic module 26, which may comprise a power electronic unit, and with an EMC protection device 33. The electronic module 26 has a widened partial region, which in the installed position of the inductive charging device 1 in the vehicle is situated at least partly above the cover 4. The electronic module 26 is connected at least partly to the cover 4 in a thermally conductive manner across a thermal interface 34, especially across a thermally conductive element. The thermal interface 34 is arranged at least partly between the cover 4 and the electronic module 26 and/or its widened partial region.

The inductive charging device 1 comprises an EMC protection device 33, which covers the electronic module 26, so that the electronic module 26 is situated between the EMC protection device 33 and the bottom 3. The EMC protection device 33 is attached to the cover 4 in an electromagnetic respect in order to achieve a substantially tight or complete shielding. The EMC protection device 33 may comprise both electrical connections 35 and fluidic connections 36.

Figure 8:
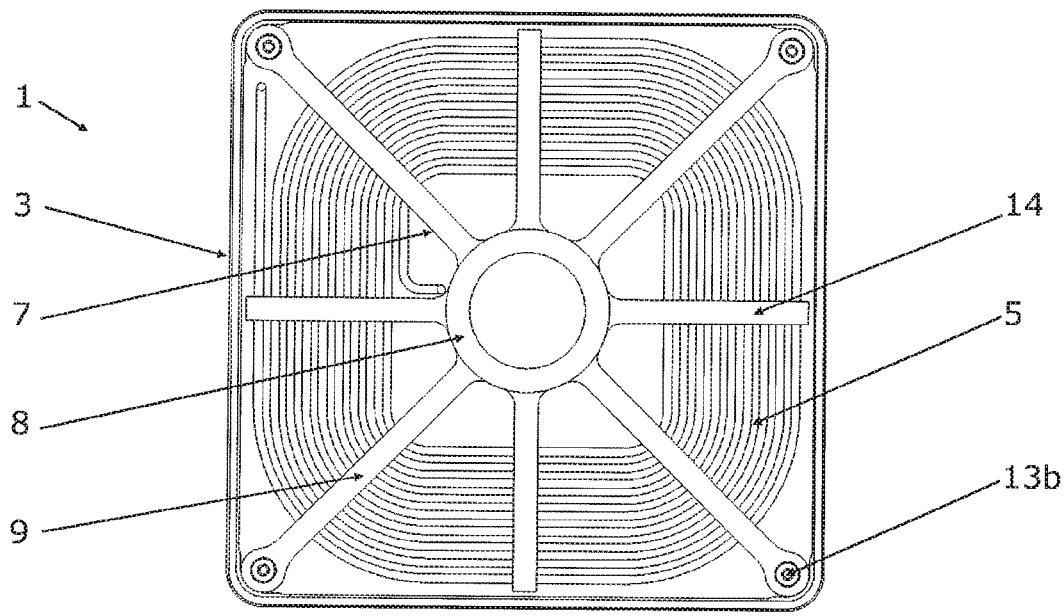
FIG. 8 shows a top view of another embodiment of the inductive charging device according to the invention.

FIG. 8 shows a top view of another embodiment of the inductive charging device 1 according to the invention, having a square shaped induction coil 5. Inside the first circular ring shaped structure portion 8, for example, neither supporting arms 38 nor supporting arms 14 are provided.

Figure 9:
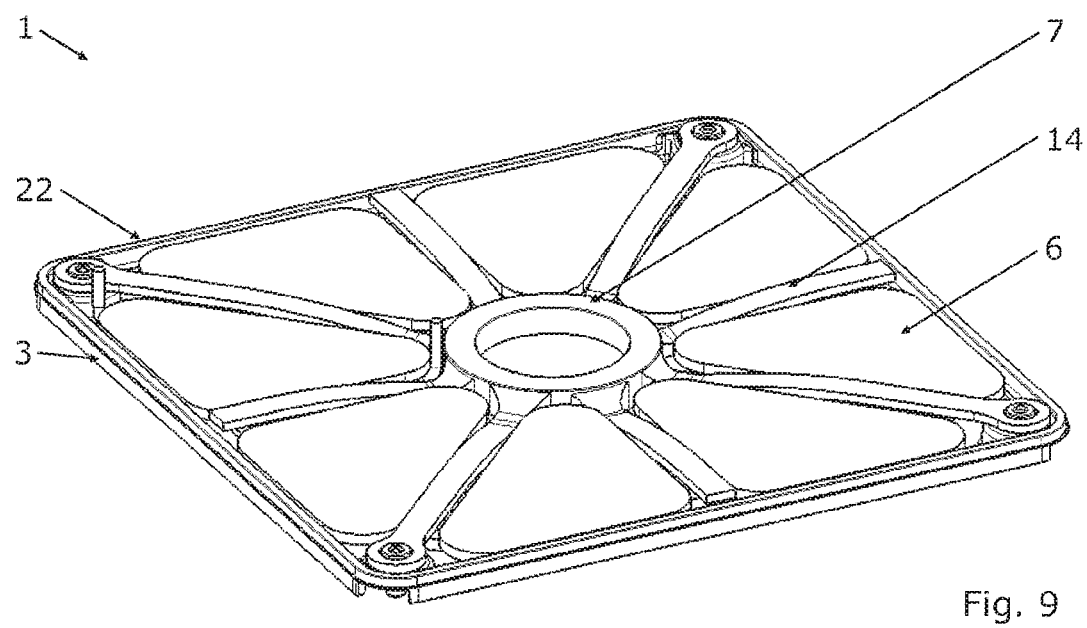
FIG. 9 shows an isometric representation of the further embodiment of the inductive charging device according to the invention.

FIG. 9 shows an isometric representation of one embodiment of the inductive charging device 1 having a supporting structure 7 and magnetic conductor 6.

Figure 10:
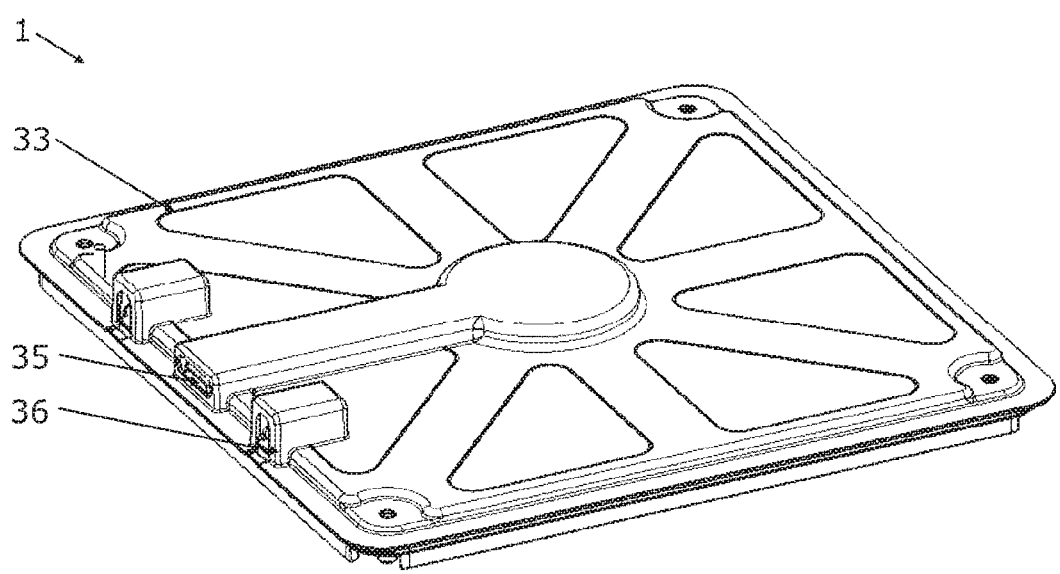
FIG. 10 shows an isometric representation of the further embodiment of the inductive charging device according to the invention with cover and EMC protection device.

FIG. 10 shows an isometric view of one embodiment of the inductive charging device 1, having an EMC protection device 33 with integrated electrical connections 35 and integrated fluidic connections 36.

Figure 11:
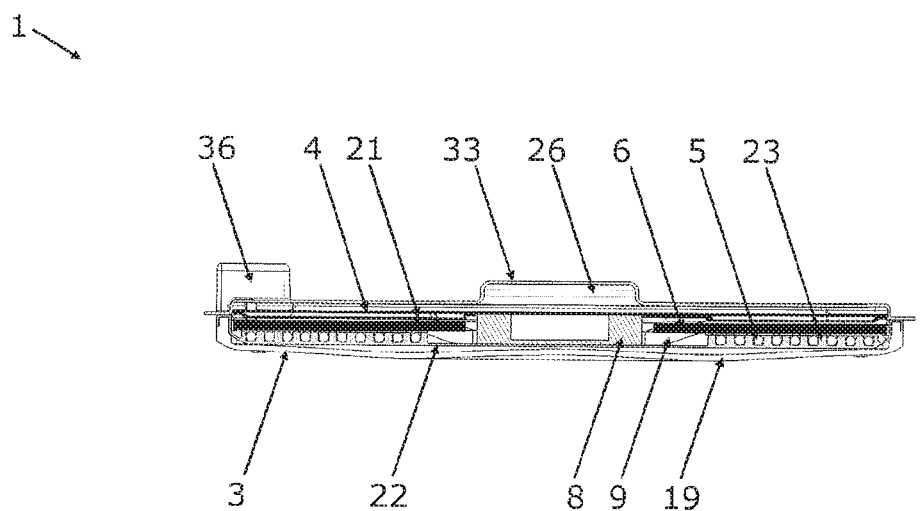
FIG. 11 shows a side view of an orthogonal section, shifted in parallel with respect to line B-B in FIG. 1, through another embodiment of the inductive charging device according to the invention.

FIG. 11 shows a side view of an orthogonal section through the further embodiment of the inductive charging device 1 according to the invention, the section being shifted in parallel with the line B-B in FIG. 1. The inductive charging device 1 has at least one fluidic connection 36, an EMC protection device 33, an electronic module 26, a cover 4, at least one magnetic conductor 6, an induction coil 5, a coil holder 23, a bulge 19 of the bottom 3, a cooling duct system 21, a coil bottom 22 as well as a first structure portion 8 and a second structure portion 9. The EMC protection device 33 may be configured at least partly complementary to a partial region of the electronic module 26. The EMC protection device 33 may have a receiver that can be configured at least for the partial receiving of the electronic module 26.

Figure 12:
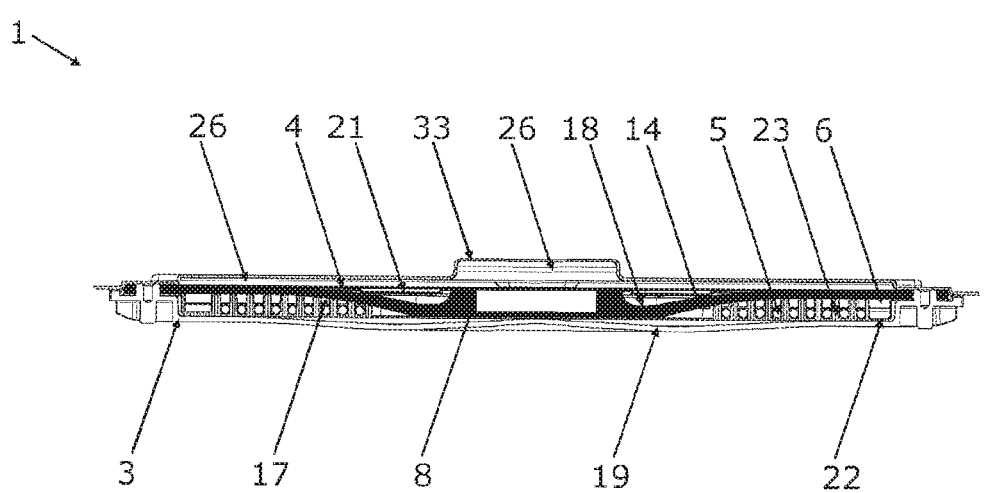
FIG. 12 shows a side view of a diagonal section along line A-A in FIG. 1 through the further embodiment of the inductive charging device according to the invention.

FIG. 12 shows a side view of a diagonal section along line A-A in FIG. 1 through the further embodiment of the inductive charging device 1 according to the invention. The inductive charging device 1 comprises at least one EMC protection device 33, an electronic module 26, a cover 4, at least one magnetic conductor 6, an induction coil 5, a coil bottom 22 and a coil holder 23, a bulge 19 of the bottom 3, a cooling duct system 21, a first structure portion 8, a second structure portion 9 with supporting arms 14. The EMC protection device 33 may be configured at least partly complementary to a partial region of the electronic module 26. The EMC protection device 33 may have a receiver that can be configured at least for the partial receiving of the electronic module 26.

Figure 13:
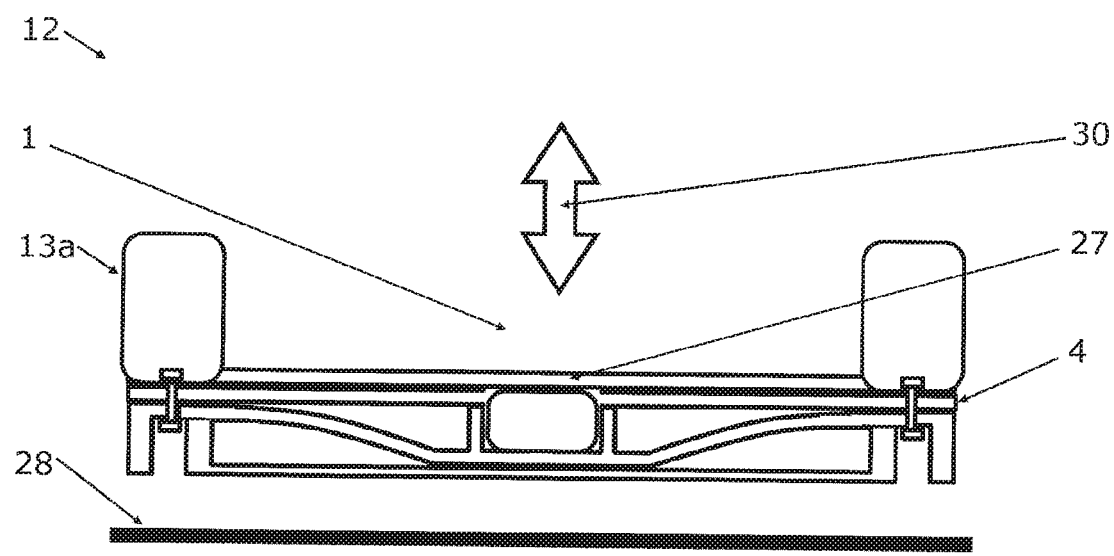
FIG. 13 shows a greatly simplified diagonal section along line A-A in FIG. 1 through another inductive charging device according to the invention in its installed position, wherein the second structure portion lies against the vehicle portion.

FIG. 13 shows a greatly simplified side view of another inductive charging device 1 according to the invention in its installed position 12 with respect to a roadway 28. The cover 4 in the installed position 12 is connected to a shielding element 27 on the vehicle side, in order to form a shield in the Z-direction 30 with respect to electrical and magnetic fields.

The vehicle-side shielding element 27, contrary to the representation drawn, may have larger dimensions than the induction coil 5, in order to also protect structural elements such as the axles and/or the longitudinal or transverse beams of the vehicle. The vehicle-side shielding element 27 may also be arranged between the structural elements 13*a* and the cover 4. The same holds for the drawing sketched in FIG. 14

In this way, a negative influencing of components of the vehicle, especially electronic ones, is prevented. The height of the inductive charging device is also determined along the Z-direction 30.

Figure 14:
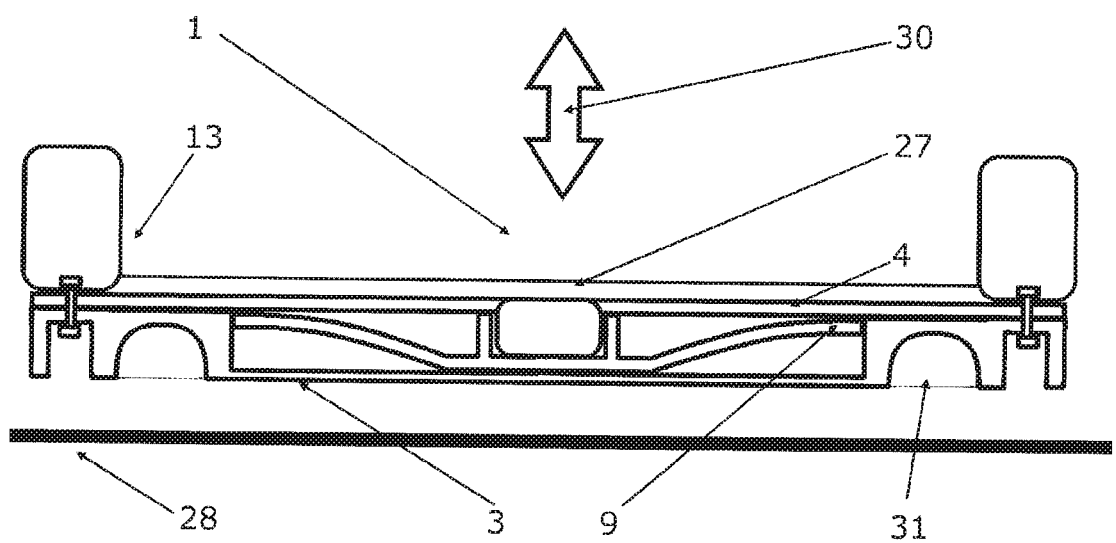
FIG. 14 shows a side view of a diagonal section along line A-A in FIG. 1 through the further embodiment of the inductive charging device according to the invention, wherein the second structure portion lies against the bottom, having structural reinforcements.

FIG. 14 shows a side view of a diagonal section along line A-A in FIG. 1 through the further embodiment of the inductive charging device 1 according to the invention, wherein the second structure portion 9 lies against the bottom 3, and not against the vehicle portion 13. At least one partial region of the bottom 3, which is situated at least partly between the second structure portion 8 and the vehicle portion 13, has structural reinforcements 31. These structural reinforcements 31 may be designed as mechanically more rigid regions. These structural reinforcements 31 serve for the transmitting of the forces occurring from the second structure portion 8 to the vehicle portion 13.

Figure 15:
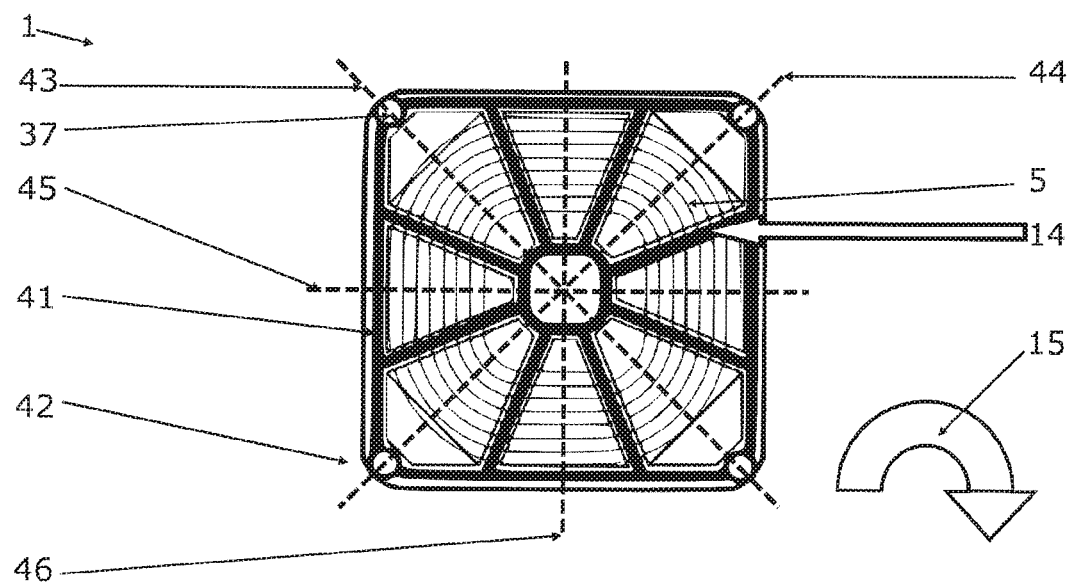
FIG. 15 shows a greatly simplified top view of an inductive charging device according to the invention with encircling structural frame.

FIG. 15 shows an inductive charging device 1 in which the second structure portion 9 forms an encircling structural frame 41 in the circumferential direction 15, which lies at least partly against a cover portion 10 of the cover 4. The second structure portion 9 comprises multiple supporting arms 14, wherein the supporting arms 14 lie respectively by a first end against the first structure portion 8 and are mutually spaced apart in the circumferential direction 15 of the first structure portion 8, wherein the supporting arms 14 lie respectively by a second end against the encircling structural frame 41. The supporting arms 14 for at least a section in the circumferential direction 15 are oriented spaced apart and/or rotated in angle, especially substantially spaced apart and/or rotated in angle by 22.5°, with respect to at least one axis of symmetry and/or plane of symmetry 43, 44, 45, 46 of the structural frame 41. In a top view plane looking down on the structural frame or in the plane of the drawing of FIG. 15, the axes of symmetry 43, 44, 45, 46 may be considered as being intersecting lines between the top view plane or plane of the drawing and the corresponding plane of symmetry 43, 44, 45, 46, while the respective plane of symmetry 43, 44, 45, 46 is oriented perpendicular and/or transversely to the top view plane or the plane of the drawing.

In at least one corner region 42 of the structural frame 41, at least one receiving device 37 is formed and the first structure portion 8 is configured substantially as a square with rounded corner regions.

The structural frame 41 may comprise at least a first diagonal axis and/or first diagonal plane 43, which is oriented perpendicular and/or transversely to a second diagonal axis and/or second diagonal plane 44. The structural frame may comprise at least a first midpoint axis and/or first midpoint plane 45, which is oriented perpendicular and/or transversely to a second midpoint axis and/or second midpoint plane 46. The midpoint axes and/or midpoint planes 45 and/or 46 may be oriented in regard to the circumferential direction 15 spaced apart and/or rotated in angle substantially by 45° with respect to the diagonal axes and/or diagonal planes 43 and/or 44.

Figure 16:
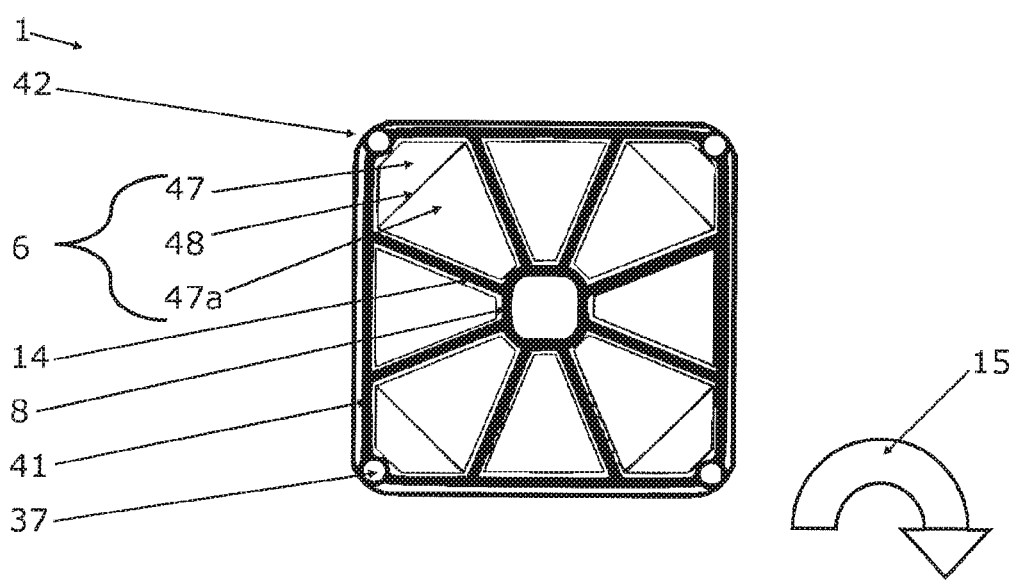
FIG. 16 shows another top view of FIG. 15 without induction coil.

It can be well seen in FIG. 16 that at least one magnetic conductor 6 is formed from multiple partial pieces 47 and 47a, especially from two or more geometrically diverse partial pieces 47 and 47a. The partial pieces 47 and 47a of the at least one magnetic conductor 6 are integrally bonded together by an intermediate material along a joining region 48.

Figure 17:
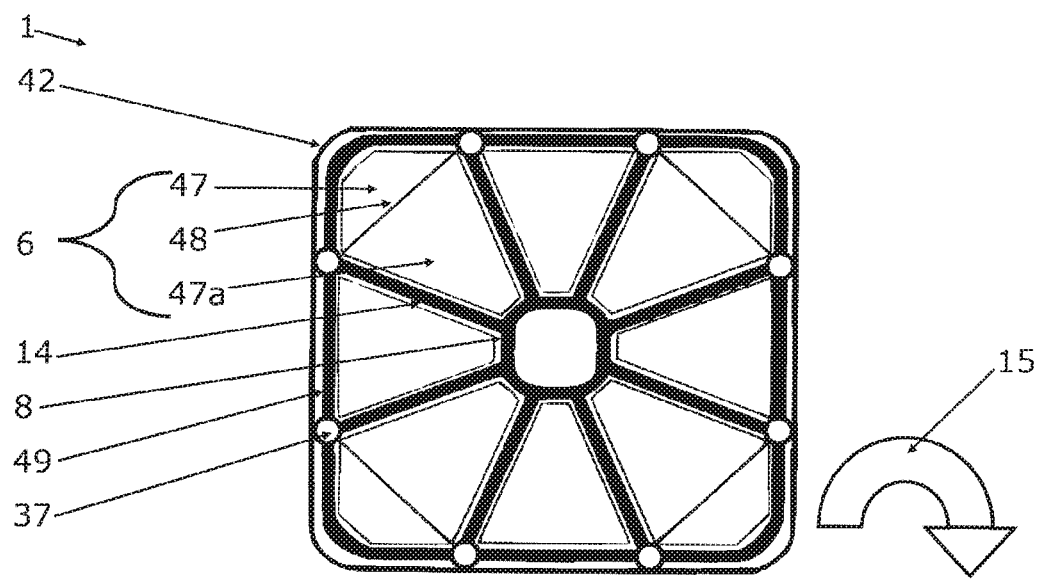
FIG. 17 shows a greatly simplified top view of another embodiment of an inductive charging device according to the invention with encircling structural frame.

In FIG. 17, as compared to FIG. 16, the inductive charging device 1 comprises an encircling structural frame 41, forming at least two receiving devices 37 on each linear extending structural frame section 49 of the structural frame 39. In this exemplary embodiment, the corner regions 42 have no receiving devices 37, although it is also conceivable to form additional receiving devices 37 in the corner regions 42 in the embodiment of FIG. 17. In FIG. 17, eight supporting arms 14 are formed, being respectively arranged at least at one receiving device 37.

Figure 18:
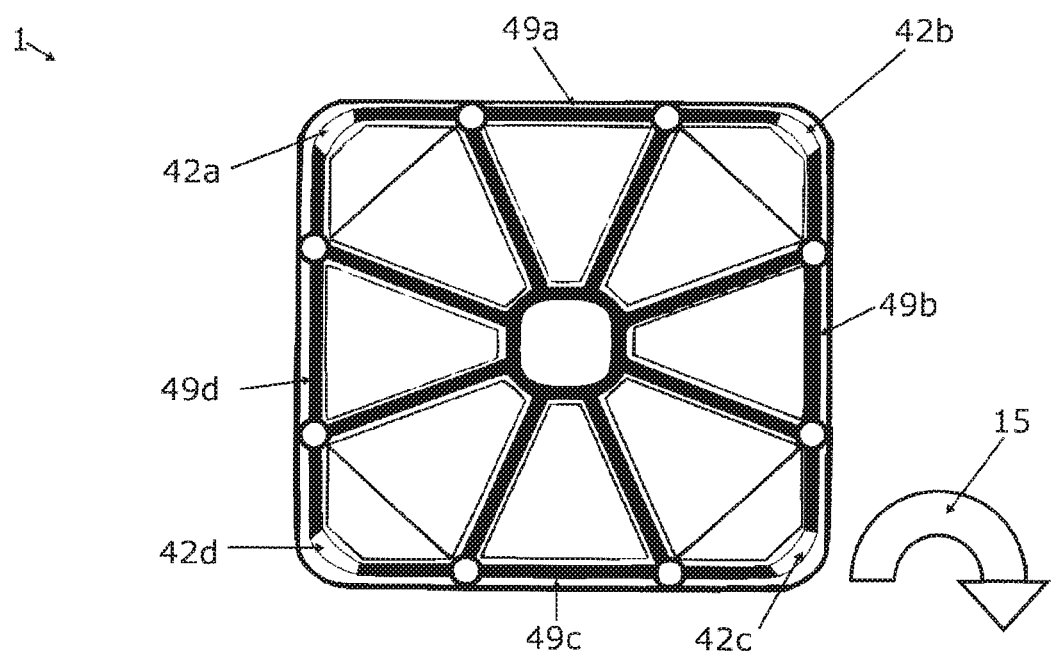
FIG. 18 shows a further simplified top view of an inductive charging device according to FIG. 17.

In FIG. 18, the corner regions 42a, 42b, 42c and 42d of the structural frame 41 are indicated as white for better clarity and the linear extending structural frame sections 49a, 49b, 49c and 49d are once again filled in black. The encircling structural frame 41 is substantially rectangular and/or square. The encircling structural frame 41 here has multiple substantially linear extending structural frame sections 49a, 49b, 49c and 49d. The linear extending structural frame sections 49a, 49b, 49c and 49d are each joined to one another across a corner region 42a, 42b, 42c or 42d. The corner regions 42a, 42b, 42c and 42d may be rounded and/or curved for at least a section. Each time two linear extending structural frame sections 49a, 49b, 49c and/or 49d situated adjacent to each other in regard to the circumferential direction 15 are oriented substantially transversely and/or perpendicular to each other. This description of the structural frame 41 also holds for FIGS. 15 to 17, where depending on the exemplary embodiment the receiving devices 37 may be formed by the corner regions 42a, 42b, 42c, 42d and/or by the structural frame sections 49a, 49b, 49c, 49d.

The invention claimed is:

1. An inductive charging device for an electrically operated vehicle, comprising:
    a housing including a bottom and a cover;
    at least one induction coil and at least one magnetic conductor each being arranged at least partly in the housing;
    a supporting structure arranged at least partly in the housing;
    the supporting structure including a first structure portion and a second structure portion; and
    wherein the second structure portion lies at least partly against a cover portion of the cover and wherein the second structure portion includes a plurality of supporting arms extending radially outwards from the first structure portion and spaced apart from one another in a circumferential direction of the first structure portion.

2. The inductive charging device according to claim 1, wherein the first structure portion lies at least partly against a bottom portion of the bottom.

3. The inductive charging device according to claim 1, further comprising at least one coil bottom arranged between the supporting structure and the bottom, wherein the first structure portion lies at least partly against the at least one coil bottom.

4. The inductive charging device according to claim 1, wherein the inductive charging device in an installed position is secured on the electrically operated vehicle via at least one vehicle portion, and wherein the second structure portion in the installed position of the inductive charging device lies at least partly against the at least one vehicle portion.

5. The inductive charging device according to claim 1, wherein:
    the inductive charging device in an installed position is secured on the electrically operated vehicle via at least one vehicle portion;
    the second structure portion in the installed position of the inductive charging device lies at least partly against the bottom; and
    wherein at least a partial portion of the bottom disposed at least partly between the second structure portion and the at least one vehicle portion includes structural reinforcements.

6. The inductive charging device according to claim 1, wherein:
    the first structure portion is configured as at least one of a circular ring, a cylinder, and a hollow cylinder;
    the first structure portion lies against a bottom portion forming a central portion of the bottom; and
    the plurality of supporting arms of the second structure portion lie against a cover portion forming a rim portion of the cover.

7. The inductive charging device according to claim 6, wherein at least one of:
    at least one of the plurality of supporting arms is arranged on at least one receiving device;
    some of the plurality of supporting arms are arranged respectively on at least one receiving device; and
    all of the plurality of supporting arms are arranged respectively on at least one receiving device.

8. The inductive charging device according to claim 1, wherein at least one of the plurality of supporting arms has a partial portion of a nonlinear profile with a curvature relative to the bottom.

9. The inductive charging device according to claim 1, wherein at least one of:
    the at least one induction coil is arranged at least partly between the second structure portion of the supporting structure and the bottom of the housing; and
    at least a partial portion of the bottom defines a bulge extending away from the cover.

10. The inductive charging device according to claim 1, further comprising at least one cooling duct system provided between the cover and the bottom for the flow control of a fluid.

11. The inductive charging device according to claim 1, further comprising at least one coil bottom and a coil holder provided between the at least one induction coil and the bottom.

12. The inductive charging device according to claim 11, wherein at least one of the first structure portion lies at least partly against the at least one coil bottom and the first structure portion is connected in a shear-resistant manner to the at least one coil bottom; and
    wherein the second structure portion is connected in a shear-resistant manner to the cover.

13. The inductive charging device according to claim 1, further comprising at least one of:
a first thermally conductive element provided between the at least one magnetic conductor and a cooling duct system disposed between the cover and the bottom; and
a second thermally conductive element provided between the at least one induction coil and the at least one magnetic conductor.

14. The inductive charging device according to claim 1, wherein the cover has a receiving portion, and wherein an electronic module is accommodated in the receiving portion.

15. The inductive charging device according to claim 1, wherein the cover in an installed position together with a separate vehicle-side shielding element provides a shielding against electrical and magnetic fields.

16. The inductive charging device according to claim 1, further comprising at least one of:
a first electronic module arranged on a side of the cover facing away from the bottom; and
a second electronic module arranged in a receiving portion in the cover.

17. The inductive charging device according to claim 1, further comprising an electromagnetic compatibility (EMC) protection device, wherein the EMC protection device is structured and arranged to completely cover an electronic module and is secured on a side of the cover facing away from the bottom to provide a shielding and facilitate reducing interference from electromagnetic signals given off by the electronic module; and
wherein the EMC protection device includes at least one of an electrical connection and a fluidic connection.

18. An inductive charging device for an electrically operated vehicle, comprising:
a housing including a bottom and a cover;
at least one induction coil and at least one magnetic conductor each being arranged at least partly in the housing;
a supporting structure arranged at least partly in the housing;
the supporting structure including a first structure portion and a second structure portion;
wherein the second structure portion lies at least partly against a cover portion of the cover; and
wherein the second structure portion is structured and arranged to provide an encircling structural frame in a circumferential direction of the first support structure, and wherein the encircling structural frame lies at least partly against a cover portion of the cover.

19. The inductive charging device according to claim 18, wherein at least one of:
at least one receiving device is provided in at least one corner region of the encircling structural frame; and
the first structure portion has a square shape with rounded corner regions.

20. The inductive charging device according to claim 18, wherein:
the second structure portion includes a plurality of supporting arms;
the plurality of supporting arms respectively lie via a first end against the first structure portion and are mutually spaced apart in the circumferential direction of the first structure portion;
the plurality of supporting arms respectively lie via a second end against the encircling structural frame; and
the plurality of supporting arms for at least a section in the circumferential direction are at least one of oriented spaced apart and rotated in angle with respect to at least one of (i) at least one axis of symmetry of the encircling structural frame and (ii) at least one plane of symmetry of the encircling structural frame.

* * * * *